(12) United States Patent  (10) Patent No.: US 7,998,352 B2
Hicks et al.  (45) Date of Patent: Aug. 16, 2011

(54) METHOD AND DEVICE FOR CLEANUP AND DEPOSIT REMOVAL FROM INTERNAL HOT WATER SYSTEM SURFACES

(75) Inventors: Peter D. Hicks, Aurora, IL (US); David A. Grattan, Bolingbrook, IL (US)

(73) Assignee: Nalco Company, Naperville, IL (US)

( * ) Notice: Subject to any disclaimer, the term of this patent is extended or adjusted under 35 U.S.C. 154(b) by 308 days.

(21) Appl. No.: 11/852,695

(22) Filed: Sep. 10, 2007

(65) Prior Publication Data

US 2009/0065440 A1  Mar. 12, 2009

(51) Int. Cl.
| | |
|---|---|
| C02F 1/00 | (2006.01) |
| C02F 1/70 | (2006.01) |
| C02F 1/72 | (2006.01) |
| C23F 11/00 | (2006.01) |
| C23F 15/00 | (2006.01) |

(52) U.S. Cl. ........ 210/746; 210/739; 210/742; 210/757; 210/758; 210/765; 210/103; 210/143; 210/167.3; 210/167.32; 210/198.1; 422/7

(58) Field of Classification Search .................. 210/746; 422/3, 7
See application file for complete search history.

(56) References Cited

U.S. PATENT DOCUMENTS

| | | | |
|---|---|---|---|
| 4,269,717 A | 5/1981 | Slovinsky | |
| 4,574,071 A | 3/1986 | DeSilva et al. | |
| 4,648,043 A | 3/1987 | O'Leary | |
| 4,775,005 A | 10/1988 | Beyer et al. | |
| 4,830,757 A | 5/1989 | Lynch et al. | |
| 5,236,845 A | 8/1993 | Pierce et al. | |
| 5,243,297 A | 9/1993 | Perkins et al. | |
| 5,268,092 A | 12/1993 | Eden | |
| 5,332,494 A | 7/1994 | Eden et al. | |
| 5,342,510 A | 8/1994 | Eden et al. | |
| 5,348,664 A | 9/1994 | Kim et al. | |
| 5,422,014 A | 6/1995 | Allen et al. | |
| 5,470,484 A | 11/1995 | McNeel | |
| 5,855,791 A | 1/1999 | Hays et al. | |
| 6,068,012 A | 5/2000 | Beardwood et al. | |

(Continued)

FOREIGN PATENT DOCUMENTS

JP  2003/254503  9/2003

OTHER PUBLICATIONS

"Model 396 ORP Sensor Instruction Manual", Mar. 2006, Rosemount Analytical, PN 51-396P/rev.H, pp. 1, 3 and 25.*

(Continued)

*Primary Examiner* — Duane Smith
*Assistant Examiner* — Paul J Durand
(74) *Attorney, Agent, or Firm* — Edward O. Yonter; Michael B. Martin

(57) ABSTRACT

Disclosed is a method of inhibiting and/or removing deposits from internal surfaces in a hot water system. The method includes controlling a real-time oxidation-reduction potential in a hot water system to alter the dynamic between deposit constituents and the bulk water of the system to inhibit deposition or initiate deposit removal. The method is equally effective for a system undergoing a wet layup sequence or in an online operational system. The invention further includes a multi-component deposit inhibition and/or removal device, including a receiver, a processor, and a transmitter that work in unison to alter the system dynamics to inhibit or remove deposits.

20 Claims, 6 Drawing Sheets

U.S. PATENT DOCUMENTS

| | | | |
|---|---|---|---|
| 6,077,445 A * | 6/2000 | Ascolese | 210/746 |
| 6,350,376 B1 | 2/2002 | Imaoka et al. | |
| 6,391,256 B1 | 5/2002 | Moon et al. | |
| 6,402,984 B1 | 6/2002 | Nakajima et al. | |
| 6,409,926 B1 | 6/2002 | Martin | |
| 6,587,753 B2 | 7/2003 | Fowee | |
| 6,609,070 B1 | 8/2003 | Lueck | |
| 6,620,315 B2 | 9/2003 | Martin | |
| 6,813,532 B2 | 11/2004 | Eryurek et al. | |
| 7,141,175 B2 * | 11/2006 | Verma | 210/739 |
| 2003/0004681 A1 * | 1/2003 | Fandrich et al. | 702/183 |
| 2006/0157420 A1 * | 7/2006 | Hays et al. | 210/739 |
| 2006/0169646 A1 | 8/2006 | Andree et al. | |
| 2006/0182651 A1 * | 8/2006 | Bailey et al. | 422/3 |
| 2008/0179179 A1 | 7/2008 | Hicks et al. | |

OTHER PUBLICATIONS

Buecker B., "Water Treatment: The Continuing Battle Against FAC," Power Engineering, Pennwell Publishing Co., Tulsa, OK, vol. 106, No. 9, Sep. 1, 2002.

Dedekind et al., "Oxygenated Feedwater Treatment at the World's Largest Fossil Fired Power Plant—Beware the Pitfalls—", *Power Plant Chemistry*, vol. 3, No. 11, Nov. 2001.

Filer, "Power Plant Chemistry Measurement Advancements: Oxidation Reduction Potential", Ultrapure Water, pp. 53-62, Nov. 1998.

Haag, J. et al., "On-Line Measurement of Redox and Corrosion Potentials in Water for PWR Steam Generators", *Kraftwerkstechnik, Kraftwerkstechnik GMbH.*, Essen, DE, vol. 70, No. 3, Mar. 1, 1990, pp. 236-241.

Margulova, T.Kh. et al., "Conditions of dosing oxygen and hydrogen peroxide into the condensate of power units of supercritical parameters (Abstract)", Teploenergotika, 1977.

Niedrach, L. W., "Electrodes for Potential Measurements in Aqueous Systems at High Temperatures and Pressures." Angewandte Chemie-International Edition in English, vol. 26, No. 3, Mar. 1987.

Uchino et al., "Study on the Practical Application of a Method for Corrosion Potential Measurement in a Water Quality Monitoring System used During Combined Water Treatment," PowerPlant Chemistry, vol. 3, No. 9, pp. 511 to 517, 2001.

\* cited by examiner

METHOD AND DEVICE FOR CLEANUP AND DEPOSIT REMOVAL FROM INTERNAL HOT WATER SYSTEM SURFACES

TECHNICAL FIELD

This invention relates generally to methods of inhibiting deposit formation and removing deposits from internal surfaces of hot water systems. More specifically, the invention relates to measuring real-time oxidation-reduction potential at operating temperature and pressure in one or more operational protective zones and using those measurements to control feed of active chemical species. The invention has particular relevance to locally and/or globally inhibiting and/or removing deposits from internal surfaces in simple or complex hot water systems.

BACKGROUND

Hot water systems are generally composed of all-ferrous metallurgy or mixed metallurgy, such as copper or copper alloy systems, nickel and nickel-based alloys, and stainless steel and may also be mixed with mild steel components. Many general classes/components of hot water systems exist, such as boilers, hot water heaters, heat exchangers, steam generators, steam jackets and molds, nuclear power electric systems, combustion engine and diesel coolant systems, evaporator systems, thermal desalination systems, papermaking operations, fermentation processes, the like, and attached ancillary devices. They are dynamic operating systems that undergo a myriad of REDOX Stress events (i.e., any electrochemical event in the hot water system related to changes in oxidative or reductive state of the water). Such events generally include any process that implicates the oxidation-reduction potential ("ORP") space or regime in the system.

These events may result from a multitude of factors including species inherently found in the water, leaks from various components, contamination from air in-leakage, malfunctioning pumps, seals, vacuum lines, and gauges. Further, increased use of oxygen-enriched water, such as boiler make-up water, returned steam condensate, and/or raw surface or subsurface water, deaerator malfunctions, steam and turbine load swings, and problems with chemical feed pumps cause unplanned reduction or increase in chemical treatment feed rates. Uncontrolled REDOX Stress events can cause serious general and localized corrosion problems, such as pitting, stress corrosion cracking, corrosion fatigue, and/or flow accelerated corrosion problems in hot water systems. By their nature, these problems tend to be electrochemical and thus tied-in to the oxidative-reductive properties of the environment and the structural material interaction.

Additional problems are encountered when plant equipment undergoes intermittent operations, including using steam in a periodic fashion. For example, a steam operated mold press in tire manufacturing or components of a papermaking process may be in that category. In the extreme, a steam system might be put into a layup sequence to either be idled (or slowed down) or started from idle to operating conditions. A main concern is corrosion that occurs in situ followed by corrosion product transport to other plant locations during startup or shutdown of the intermittent process. Apart from the localized damage caused by in situ corrosion, the corrosion product transport can foul a multitude of components. Typically, the worst fouling occurs on the boiler tube walls where deposits can lead to poor heat transfer, increased boiler tube temperatures, under-deposit corrosion, local overheating, and tube failure. In situ corrosion and corrosion product transfer may also impact the balance of the entire system, not just the boiler/steam generator. Impacted components may include transfer piping, holding tanks, and ancillary equipment that come into contact with the hot water/steam process fluids.

Although some conventional methods are practiced today to identify REDOX Stress events in hot water systems, because of hot water system dynamics most REDOX Stress events are unpredictable. These methods are not widely practiced because they have inherent drawbacks (see below). As a consequence, the majority of REDOX Stress events go undetected and thus uncorrected. Uncontrolled REDOX Stress events can lead to serious corrosion and deposit problems in these systems, which negatively impact plant equipment life expectancy, reliability, production capability, safety, environmental regulations, capital outlay, and total plant operation costs.

Identifying REDOX Stress events currently includes both online instruments and grab sample wet chemical analysis test methods. In both approaches, the sample has to first undergo sample conditioning, such as cooling, prior to measurement. Examples of online instruments include dissolved oxygen meters, cation conductivity instruments, room temperature ORP instruments, pH instruments, sodium analyzers, hardness analyzers, specific conductivity meters, silica analyzers, particle and turbidity meters, reductant analyzers, and the like. General corrosion monitoring, such as coupon and electrochemical analysis, is typically performed after cooling a sample or at elevated temperatures. Grab sample test methods include analyzing for dissolved oxygen, pH, hardness, specific conductivity, total and soluble iron, copper, and silica, reductant excess, and the like.

Some drawbacks of these methods include the following. Grab sample analysis gives a single point in time measurement and consequently is not a viable continuous monitoring method for REDOX Stress events. It also often has inadequately low-level detection limits. Online monitors do not provide a direct measurement of REDOX Stress and thus cannot indicate whether or not a REDOX Stress event is occurring at any particular time. Corrosion monitors detect general corrosion, but are not capable of measuring changes in local corrosion rates or deposits caused by REDOX Stress events. Online reductant analyzers measure the amount of reductant, but not the net REDOX Stress a system is undergoing at system temperature and pressure. That REDOX Stress can occur in the apparent presence of a reductant is thus another drawback of this technique.

Dissolved oxygen ("DO") meters have similar drawbacks. Measuring the amount of DO (an oxidant) but not necessarily the net REDOX Stress a system is undergoing is not an accurate indicator of corrosion stress. The sample also must be cooled prior to DO measurement thus increasing the lag time in detecting when the REDOX Stress event started. Further, the potential for oxygen consumption in the sample line could cause inaccurate readings. REDOX Stress can also occur in the apparent absence of DO and little or no DO in the sample could potentially be a false negative. In addition, all of the instruments described above are relatively costly to purchase, and require frequent calibration and maintenance.

Corrosion coupons give a time-averaged result of general system corrosion. Again, this technique does not offer a real-time indication or control of REDOX Stress events. Online electrochemical corrosion tools are inadequate for localized corrosion determinations and cannot be used in low conductivity environments. Integrated metal sampling techniques that use filtration to obtain a water sample on a cooled sample stream also provide no active real-time response with respect to REDOX Stress events.

Room temperature ORP is a direct measurement of the net ORP of a sample taken from the system. A drawback of this technique is that it fails to indicate what is happening at system temperature and pressure. REDOX Stress events that occur at operating temperature and pressure often cannot be observed at room temperature, as process kinetics and thermodynamics vary with temperature. In addition, room temperature ORP measuring devices are more sluggish and more likely to become polarized. Reliability of such devices is poor and they need frequent calibration and maintenance.

There thus exists an ongoing need to develop methods of inhibiting and removing deposits from internal hot water system surfaces and components, particularly by monitoring and controlling real-time ORP in hot water systems at operating temperature and pressure.

SUMMARY

A myriad of processes occurring in a hot water system contribute to the ORP, which in turn acts as a REDOX Stress indicator for the hot water system. Adjustments to the ORP act to change the dynamic (e.g., equilibrium constant) between constituents/components in a deposit on an internal surface of the system and the water within the system. Such adjustments may be used as a tool to inhibit and/or remove deposits (i.e., deposit control).

In contrast to conventional room temperature measurements, ORP measurements taken in real-time at system operating temperature and pressure (including at temperatures and pressures encountered during intermittent operations, such as a layup process including, for example, a shutdown or startup sequence) are capable of indicating primary and secondary REDOX Stress events occurring in the system in real-time. Such real-time ORP monitoring may be used to measure, identify, and assess REDOX Stress demands in the system and can act as a direct or indirect corrosion process indicator. This invention accordingly provides a method of monitoring and controlling ORP in a hot water system in real-time at operating temperature and pressure to inhibit and/or remove deposits on internal surfaces in the system. It should be appreciated that the method has equal application in the steam producing equipment (i.e., boiler and/or boiler feed water), the steam usage hardware/components/equipment, the condensate zones, and/or other plant areas/components having an impact on plant balance.

In an aspect, this invention provides a method of inhibiting and/or removing a deposit from an internal surface in a hot water system by controlling a real-time ORP at operating temperature and pressure in the hot water system. The operating temperature and pressure may vary considerably depending on whether the system is operational or undergoing a layup process. The method includes defining one or more operational protective zones ("zone" or "zones") in the hot water system and selecting at least one of the defined zones. One or more of the selected zones includes at least one ORP probe operable to measure the real-time ORP and communicate with a controller. An ORP setting is assigned to one or more of the selected zones and one or more of the assigned ORP settings optimizes the dynamic between one or more deposit constituents to either inhibit deposition or cause release of at least a portion of the deposit into the water of the online hot water system.

In alternative embodiments, the real-time ORP is intermittently or continuously measured at one or more of the selected zones and transmitted to the controller, which assesses whether the measured real-time ORP or a calculated ORP based upon the measured real-time ORP conforms to the optimized ORP setting. If the measured real-time ORP or the calculated ORP does not conform to the optimized ORP setting, the method includes taking action to affect the real-time ORP.

In an embodiment, the action includes feeding an effective amount of one or more active chemical species into one or more zones of the hot water system. In another embodiment, the action includes altering system temperature to impact the real-time ORP. In alternative embodiments, the action includes instituting any mechanical, operational, or chemical process to impact the real-time ORP and shift it into the desired ORP setting may be instituted. Such action is intended to inhibit deposition and/or cause release of at least a portion of the deposit.

In another aspect, the invention includes a deposit inhibition and/or removal device for a hot water system. The hot water system can be in any phase of a layup sequence or is online and operational and has one or more zones, where a subset of the zones is selected zones. The device also includes a receiver that is in communication with one or more ORP probes associated with one or more of the selected zones. A subset of ORP probes is activated and operable to measure a real-time ORP at operating temperature and pressure in the hot water system. In alternative embodiments, the operating temperature and pressure varies depending upon whether the system is undergoing a layup sequence or is operational. The device further includes a processor operable to interpret the measured real-time ORP communicated to the receiver from each activated ORP probe.

In alternative embodiments, the processor interprets the measured real-time ORP directly and/or interprets a calculated ORP based upon the measured real-time ORP. The interpreted ORP indicates a dynamic between one or more components in the deposit on an internal surface of the hot water system and the water of the hot water system. To affect changes in the dynamic, a preferred embodiment includes a transmitter in communication with a feeding device operable to manage introduction of one or more active chemical species into the hot water system. If the interpreted real-time ORP does not conform to an optimized ORP setting, the processor is operable to send an output signal through the transmitter to the feeding device. In another embodiment, the transmitter is in communication with a temperature-altering mechanism operable to initiate a sequence in one or more zones that impacts the real-time ORP in the hot water system.

The optimized ORP setting relates to the ongoing dynamic of deposit formation and/or release and suitable real-time ORP control inhibits deposition and/or effectuates release of at least a portion of the deposit into the water of the hot water system.

In alternative embodiments, the ORP setting is either a same ORP setting for each phase or a different ORP setting for at least two of the phases. The ORP setting may also be timed/ramped in a continuous or stepwise fashion to alter the real-time ORP in one or more zones.

It is an advantage of the invention to provide a method of inhibiting and/or removing deposits on internal surfaces of a hot water system by reacting to a real-time ORP by taking action to alter the real-time ORP by either feeding one or more active chemical species into the hot water system or initiating a temperature-altering sequence.

It is another advantage of the invention to provide a method of inhibiting and/or removing deposits on internal surfaces of a hot water system undergoing a wet layup sequence by managing the sequence to maintain an ORP setting in one or more operational protective zones.

A further advantage of the invention is to provide a hot water system deposit inhibition and/or removal device including a receiver, a processor, a transmitter, and a feeding or temperature-altering device, which work in unison to control a real-time ORP in one or more operational protective zones during a plurality of layup sequence phases in the hot water system.

An additional advantage of the invention is to provide a hot water system deposit inhibition and/or removal device including a receiver, a processor, a transmitter, and a feeding device, which work in unison to control a real-time ORP in one or more operational protective zones in an online and operational hot water system.

Another advantage of the invention is to increase hot water system efficiency during layup by enabling improved maintenance and control of system parameters thus allowing quicker recovery from layup.

Yet another advantage of the invention is to optimize operating costs for a variety of hot water systems and components by accurately inhibiting and/or removing internal deposits.

Additional features and advantages are described herein, and will be apparent from, the following Detailed Description, Examples, and Figures.

DETAILED DESCRIPTION

Figure 1:
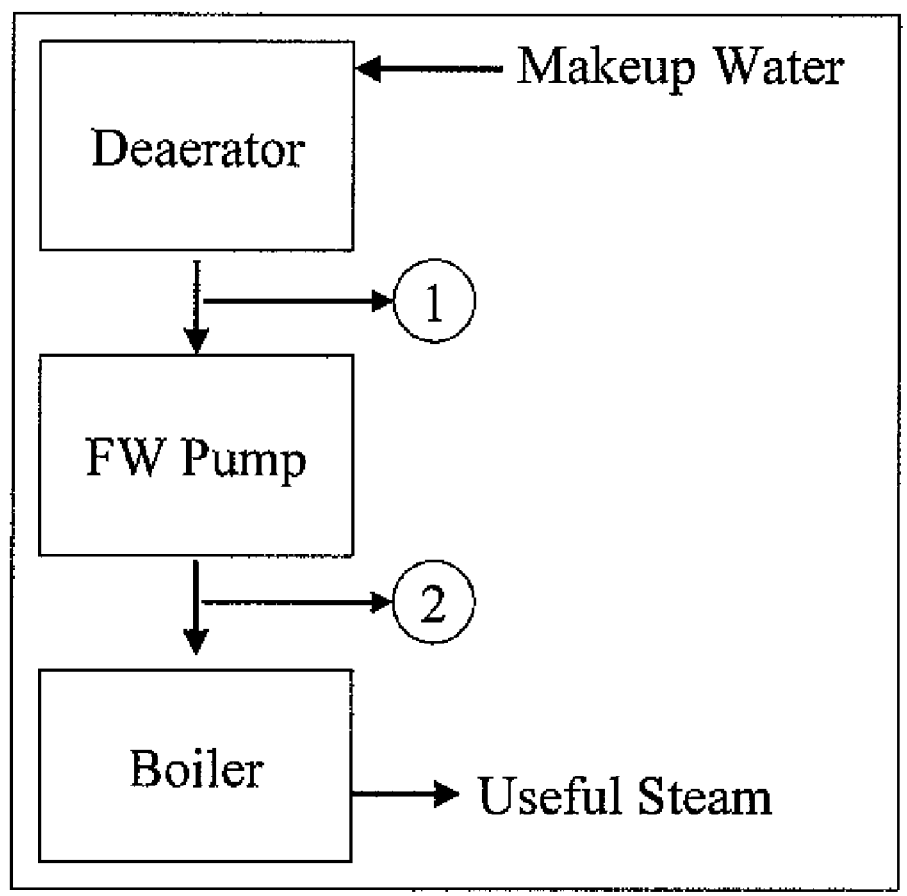
FIG. 1 depicts a simplified 3-component hot water system, where make-up water flows through a "Deaerator," a "FW Pump," and into a "Boiler" and the boiler in turn generates "Useful Steam" for subsequent use in various processes.

Hot water systems are often not continuously operated. Between operational cycles, these systems typically undergo a layup sequence to bring them offline and into an idle mode. Special considerations need to be made to remove and/or inhibit deposits on internal surfaces while a hot water system is online and operational, which may include intermittent operational phases, such as an entering shutdown phase, a shutdown phase, an exiting shutdown phase, and an operational phase. Required concentrations of active chemical species can be higher during intermittent operations (sometimes one or more orders of magnitude) than during normal hot water system operation. By monitoring real-time ORP at operating temperature and pressure (which varies depending upon the particular stage) it is possible to fine-tune and control the ORP space during each phase of full operation and/or intermittent operation (e.g., layup sequences). It is contemplated that this monitoring may be used on its own or in concert with one or a multitude of other monitoring and/or control tools.

The following definitions are not intended to limit the scope of the invention. The defined terminology is for the purpose of describing particular embodiments only and for providing guidance in interpreting those descriptions. This invention will be limited only by the appended claims and equivalents thereof.

"Active chemical species" refers to oxidants, reductants, corrosion-inhibitors, corrodants, and other species that have an affect on or influence the ORP (and thus the dynamic (e.g., equilibrium constant or other dynamics) between internal deposit constituents and the system water) in a hot water system. Such species are described in more detail below.

"Controller system," "controller," and similar terms refer to a manual operator or an electronic device having components such as a processor, memory device, digital storage medium, cathode ray tube, liquid crystal display, plasma display, touch screen, or other monitor, and/or other components. In certain instances, the controller may be operable for integration with one or more application-specific integrated circuits, programs, computer-executable instructions, or algorithms, one or more hard-wired devices, wireless devices, and/or one or more mechanical devices. Some or all of the controller system functions may be at a central location, such as a network server, for communication over a local area network, wide area network, wireless network, Internet connection, microwave link, infrared link, and the like. In addition, other components such as a signal conditioner or system monitor may be included to facilitate signal-processing algorithms.

"Hot water system," "system," and like terms refer to any system where hot water is in contact with metallic surfaces. "Hot water" means water having a temperature from about 37° C. up to about 370° C. The system may operate at or below atmospheric pressure or a pressure up to about 4,000 psi. Systems undergoing a layup sequence or a laid-up system will typically have a lower temperature than a fully operational system; however, the encountered temperatures are generally well above ambient. In cases where intermittent operations occur and layup duration increases, encountered temperatures may transition or approach ambient temperatures.

"Layup" refers to discontinuing steam-producing operations for short or long periods, including processes that do not continuously use hot water or produced steam.

"ORP," "@T ORP™ (a Nalco Company® trademark)," "at-T ORP," and "real-time ORP" refer to oxidation-reduction potential for an industrial water system at operating temperature and pressure. In certain instances herein, ORP is indicated as room temperature ORP.

"ORP probe" refers to any device capable of measuring and transmitting a real-time ORP signal. Though any suitable device may be used, a preferred device is disclosed in U.S. patent application Ser. No. 11/668,048, entitled "HIGH TEMPERATURE AND PRESSURE OXIDATION-REDUCTION POTENTIAL MEASURING AND MONITORING DEVICE FOR HOT WATER SYSTEMS," now pending, which is incorporated herein by reference in its entirety. Typically, the ORP probe includes a temperature detector, a noble metal electrode, and a reference electrode.

"REDOX Stress" refers to any electrochemical event in a hot water system related to changes in oxidative or reductive potential, either directly or indirectly.

In one embodiment, the method includes an automated controller. In another embodiment, the controller is manual or semi-manual, where an operator interprets the signals and determines feed water ("FW") chemistry, such as oxygen or other oxidant, oxygen scavenger or other reductant, corrosion-inhibitor, and/or corrodant dosage. In an embodiment, the measured ORP signal is interpreted by a controller system that controls FW chemistry according to the described method. In an embodiment, the controller system also interprets measured temperature to determine the amount of active chemical to add, if any. The temperature detector might also be used for information purposes, such as in alarm schemes and/or control schemes. It should be appreciated that the control scheme may incorporate pump limiters, alarming, intelligent control, and/or the like, based off further inputs, such as pH, DO levels, and other water constituents/properties.

It is contemplated that the disclosed method is applicable in a variety of hot water systems, including both direct and satellite active chemical feeding designs and including any number of phases in the operational and layup sequences. "Direct" feeding typically refers to measuring real-time ORP at a zone and feeding active chemical to the same zone. "Satellite" feeding usually refers to measuring real-time ORP at a zone and feeding active chemical to a different zone. In alternative embodiments, any zone may be associated with any layup phase and the zones used during a particular phase may differ from zones used during another phase.

Representative systems and system components include condensers, both tube and shell side; heat exchangers; pumps; seals; mild steel or copper-based FW heaters; copper-based alloy surface condensers; deaerators; water tube and fire tube boilers; paper machines; condensate receivers; steam condensate transfer lines with or without steam traps; process liquid heat exchangers; evaporators; desalination systems; sweet-water condensers; attemperated water sources; flow-accelerated corrosion protection; air heaters; engine coolant systems for diesel and gasoline; injection molds and other molding devices; and the like.

Other exemplary processes include papermaking process, such as Kraft pulping and bleaching processes; wafer polishing and planarization processes (e.g., silicon wafer polishing); combustion gas emission (e.g., $SO_2$, $NO_X$, mercury); fermentation processes; geothermal processes; tire molding processes; and aqueous organic redox synthesis (i.e., polymerization processes that require redox initiators).

Conventional corrosion control regimes use one point feed. The disclosed invention uses targeted feed by precisely determining the needed active chemicals and the proper amount/dosage of those chemicals. Such targeted feed is highly effective in removing internal deposits. For example, relatively oxidizing zones, such as low-pressure FW heaters (copper-based metallurgy), and more reducing zones, with high-pressure FW heaters (non copper-based metallurgy), may be differentiated to alleviate flow-accelerated corrosion-related issues. Relatively oxidizing conditions exist within all ferrous FW heaters at sections of pressurized water reactors versus relatively reducing final FW heater regimes for stress corrosion cracking mitigation in steam generators.

The invention is capable of detecting and reacting to both primary and secondary REDOX Stress events to inhibit and/or remove internal deposits. Typically, the implementer knows the system implications and possible REDOX stressors and is able to accordingly select one or more of the defined operational protective zones to appropriately monitor a given system's @T ORP space. In this way, it is possible to inhibit and/or remove deposits from an online and operation system or during any phase of the layup sequence by feeding REDOX active species based off local and/or remote @T ORP readings as a primary REDOX Stress indicator. The @T ORP space is monitored and measured to assess and identify system demands, which are then compared to known/formulated metrics to react, solve, and control REDOX Stress events. As an indicator of secondary REDOX Stress, the invention can detect processes resulting from prior, primary REDOX Stress, where the primary REDOX stressor is no longer evident.

The ORP probe may detect several different factors that contribute to REDOX Stress events in the hot water system. For example, an ORP probe in a selected zone for a given phase can act as a direct indicator of real-time ORP in that zone or in another zone. In an embodiment, the real-time ORP is measured in a first selected zone and one or more active chemical species are fed to the first selected zone, if the measured real-time ORP at the first selected zone or the calculated ORP does not conform to the optimized ORP setting for the first selected zone. In another embodiment, the real-time ORP is measured at a first selected zone and one or more active chemical species are fed at one or more other selected zones, if the measured real-time ORP or the calculated ORP does not conform to the optimized ORP setting for the first selected zone. In a further embodiment, one or more real-time ORPs are measured at one or more of the selected zones and one or more other real-time ORPs are calculated for one or more other selected zones, based upon one or more of the measured real-time ORP(s).

As described above, in some cases, the measured ORP in a first zone is used to calculate an ORP for another zone. Such calculations may be done by making various assumptions regarding system dynamics or by measuring temperature/water chemistry differences between zones. Using mixed potential theory and thermodynamic/kinetic principles known to those skilled in the art also allows for approximating conditions in other zones. However, such calculations are typically subject to inherent inaccuracies; thus, the preferred method is to measure the real-time ORP in situ in selected zones.

Several important factors exist for determining or defining specific operational protective/control zones for an online and operational system or for any phase of the layup sequence or process. The goal for any particular system is to achieve @T ORP "Plant Specific Boiler Best Practices" for that system. For instance, certain plants are limited to certain chemistries due to control philosophy, environmental constraints, economics, industry standards, etc. System temperatures also may dramatically vary from one plant to another, which requires adjusting the specific control philosophy employed, explained in more detail in the below Examples. Different plants may also have a unique REDOX Stress baseline and inherent changes to the baseline may need to be determined.

Other factors include, specific ORP altering species purposefully added or inherently present; engineering alloys of construction for various portions/entities in the system; desired general and local corrosion mitigation; dosing limitations; other system design specifics; special considerations, such as flow-accelerated corrosion, stress, and corrosion cracking; system variability. Those skilled in the art would understand how to assess these and other system variables/specifics to implement the invention for a specific plant or system.

Ideally, any portion of a plant can have its @T ORP REDOX Stress measured and controlled using @T ORP. That is, the REDOX active species is fed directly to a specific piece of equipment (or group of equipment) and the @T ORP of the water in that piece of equipment is measured in situ and controlled for deposit inhibition/removal. This invention more specifically addresses internal deposits local to the part(s) being protected and transport of deposit and corrosion products with concomitant deleterious effects of that corrosion transport elsewhere in the system, including fouling, heat transfer surface coating, turbine deposition, etc. This type of full equipment monitoring and control approach is often not possible due to system limitations and economics. As such, parts of systems typically need to be handled as whole entities. In some cases, the entire feed water train of a boiler system might be the entity. Alternatively, only small portions of the system or groups of portions of the system are the entity. For example, the condensate associated with a single paper machine or a single boiler. It is contemplated that any portion, component, or entity (including the entire system viewed as one entity) may be selected and monitored/controlled in any phase of the layup process or in an online operational system.

In an aspect, the optimized ORP setting for one selected zone may overlap with another defined or selected zone. In another aspect, the optimized ORP setting for one selected zone is completely independent of each and every other defined or selected zone. In a further aspect, the optimized ORP setting for one selected zone is partially dependent upon factors in one or more other defined or selected zones. In an embodiment, the optimized ORP setting is determined for a first selected zone and additional ORP settings are optionally determined for additional selected zones, if any. In one embodiment, each additional optimized ORP setting is independently determined. Alternatively, one or more of the optimized ORP settings may be dependent upon one or more other optimized ORP settings. Optimized ORP settings are generally dependent and based upon operational limitations of the hot water system. Such overlap or independence of the ORP setting likewise applies for each phase of the layup process and for online operational systems.

Determining the ORP setting for any particular system may be accomplished by any suitable method. A preferred method is described in U.S. patent application Ser. No. 11/692,542, entitled "METHOD OF INHIBITING CORROSION IN INDUSTRIAL HOT WATER SYSTEMS BY MONITORING AND CONTROLLING OXIDANT/REDUCTANT FEED THROUGH A NONLINEAR CONTROL ALGORITHM," now U.S. Pat. No. 7,666,312, which is incorporated herein by reference in its entirety. It is contemplated, however, that any method known to those skilled in the art may be employed to ascertain the ORP setting for each phase and for each zone. Such methods may include using experimental data, empirical knowledge, theoretical calculations, or any other suitable method.

In an embodiment, the ORP setting is an ORP set point that is chosen from one or more single values. In another embodiment, the ORP setting is an ORP set range chosen from one or more ranges of values. Over time, the ORP setting for any selected zone may be adjusted or changed. For example, a given plant may have a timetable outlining ORP settings for different parts/components of the system at different times. This timetable would typically be based upon operational factors in the system that may change as demands on the system change.

Some zones might be kept relatively reducing and other zones might be relatively more oxidizing. For example, referring to FIG. 2, Heat Exchangers 1 and 2 might be manufactured from an alloy that exhibits low corrosion rates under more reducing conditions. Whereas, Heat Exchanger 3 might be manufactured from a different metallurgy that exhibits lower corrosion rates under more oxidizing conditions. The "Steam Producer" might then again need to be kept under more reducing conditions. The @T ORP control zones would be accordingly adjusted and monitored to compensate for these differences. Moreover, different parts of the plant might be subject to varying levels of corrosion and internal deposits.

In one embodiment, one or more of the selected zones may be in a monitoring and/or alarm mode, while one or more other selected zones is in a control mode. A selected zone in a monitoring and/or alarm mode is capable, in an embodiment, of switching between these modes. Such switching may either be manually controlled or automatic. Several examples are presented below of how @T ORP system design can be used for REDOX stress control.

In another embodiment, the @T ORP is measured across any pump to detect pump or seal corrosion or failure. In another embodiment, the method may be used to detect heat exchanger tube leaks as one active chemical species might transfer through the leak in the heat exchanger to the other side (e.g., shell side to tube side or visa versa). Another example would be a surface condenser cooling water leak into a FW condensate hot well. In a further embodiment, the method may be used to detect any unwanted intrusion of external active chemical species (i.e., system contaminants). In an alternative embodiment, @T ORP can be used to form a "fingerprint" of specific REDOX stressors in a system. In this way, it can be used as an early warning system for boiler tube rupture as more boiler makeup water is added to the system from time to time with a concomitant increase in the REDOX stress and possible internal system deposits.

Measured or calculated ORP values may indicate amounts of electrochemically active species in one or more of the selected zones. Such an indication may either be directly seen in the zone where the ORP was measured or inferred in another zone where the ORP was not directly measured. In certain cases, the measured or calculated ORP indicates an amount of chemical that indirectly affects an amount of electrochemically active species in one or more selected zones. In a more typical case, the electrochemically active species directly influences the measured or calculated ORP.

In one embodiment, the method includes ramping from one of the selected zones to another one of the selected zones after a triggering event Any event that causes a shift or change in the real-time ORP in one or more control zones may be a triggering event, such as a time-activated trigger or a temperature-activated trigger. According to an embodiment, a triggering event may be switching from one phase to another phase of the layup process in one or more parts of the system. A person having ordinary skill in the art would be able to analyze such options and choose one or more triggering events for a system. For instance, bringing pumps or other parts of the system online (or taking offline) may be a triggering event as well as switching between parts/entities of the system to inhibit/remove deposits in each respective part/entity. Steam pressure changes due to downstream use changes, such as between turbine driving and other lower pressure uses, may also be chosen as a triggering event.

Triggering may also be based on activating or deactivating various condensate streams, which could introduce specific REDOX stressors in the system. Such triggering events could be detected by probes, relays, monitors, etc., while remaining detectable by changes in the real-time ORP in one or more control zones. Moreover, the rate of change of these and other events may dictate the ramping rate from one control zone to another control zone, including instantaneous, timed, stepwise, or other suitable ramping modes.

Representative triggering events may also include numerous timed operations or timetables or other plant dynamics. A timetable could be a fixed startup time followed by ramp up in some system operations over time. For example, 30 minutes after initiating FW flow, the real-time ORP should be within 100 mV of the desired ORP setting. After 20 minutes of full load firing of the boiler, the real-time ORP should be ramped up to the ORP setting. The ramping may also be triggered when an ORP setting has been achieved elsewhere in the system, such as upstream components. For example, once an upstream control zone has achieved its ORP setting (or is within, for instance, 50 mV), a downstream control zone is activated or brought into a control mode. Such sequencing of real-time ORP control is one preferred method of sequentially inhibiting/removing deposits from internal system entity surfaces.

Changing plant dynamics may also initiate triggering and/or ramping. Such dynamics can change rapidly during a layup process. In an embodiment, the triggering event includes plant power output changes. For example, a 5% power output decrease may be the triggering event that initiates real-time ORP changes in one or more control zones in the system. The procedure used to initiate the real-time ORP changes might be, for example, an immediate signal to change the ORP setting for one or more control zones or a gradual ramp to a new ORP setting. This procedure may be based upon the rate or magnitude of power decline. Furthermore, the triggering and/or ramping mechanisms might be complex interconnections of multiple signals and timing.

In a preferred embodiment, changes and adjustments to FW chemistry (or chemistry in any part or entity of the hot water system) includes adding oxygen or other oxidant, oxygen scavenger or other reductant, corrosion-inhibitor, corrodant, and/or other active chemicals to the FW. By definition, oxygen scavengers are reducing agents, although not all reducing agents are necessarily oxygen scavengers. Reducing agents, suitable as oxygen scavengers, satisfy the thermodynamic requirements that an exothermic heat of reaction exists with oxygen. For practical applications, reasonable reactivity is typically required at low temperatures. That is, there should be some favorable kinetics of reaction to initiate deposit removal. Furthermore, other changes and adjustments to FW chemistry, such as for system control and corrosion control may include adding other oxidizing agents (oxidants), other reducing agents (reductants), and/or other active or inert chemicals.

It is also highly desirable that the reducing agent and its oxidation products are not corrosive and do not form products that are corrosive when they form in steam generating equipment. Typically, certain oxygen scavengers function optimally in certain pH ranges, temperatures, and pressures and are also affected by catalysis in one way or another. The selection of the proper oxygen scavengers for a given system can be readily determined based on the criteria discussed herein and knowledge of those skilled in the art.

Preferred reductants (i.e., oxygen scavengers) include hydrazine, sulfite, bisulfite, carbohyrazide, N,N-diethylhydroxylamine, hydroquinone, erythorbate or erythorbic acid, methyl ethyl ketoxime, hydroxylamine, tartronic acid, ethoxyquin, methyltetrazone, tetramethylphenylenediamine, semicarbazides, diethylaminoethanol, monoethanolamine, 2-ketogluconate, ascorbic acid, borohydrides, N-isopropylhydroxylamine, gallic acid, dihydroxyacetone, tannic acid and its derivatives, food-grade antioxidants, the like, and any combinations. It should be appreciated that any active chemical species may be used in the method of the invention.

Representative oxidants include oxygen, hydrogen peroxide, organic (alkyl and aryl) peroxides and peracids, ozone, quinone, acid and base forms of nitrates and nitrites, the like, and combinations.

Representative corrodants include mineral acids (e.g., HCl, $H_2SO_4$, $HNO_3$, $H_3PO_4$) and their salts/derivatives; caustics (e.g., Na, K, Li, hydroxides); ammonium hydroxide; chelants, such as EDTA, NTA, HEDP; phosphonic acid and polyphosphonic acids; phosphonates; water soluble and/or dispersible organic polymeric complexing agents, such as acrylic acid homopolymers, copolymers, and terpolymers; acrylamide; acrylonitrile; methacrylic acid; styrene sulfonic acids; the like; and combinations.

Representative corrosion inhibitors include alkali and amine salts of phosphate and polyphosphates; neutralizing amines; molybdates; tungstates; borates; benzoates; filming inhibitors, such as alkyl, alkenyl, and aryl polyamines and their derivatives; surfactant compositions, such as that disclosed in U.S. Pat. No. 5,849,220; oligomeric phosphinosuccinic acid chemistries, such as that disclosed in U.S. Pat. No. 5,023,000; the like; and combinations.

EXAMPLES

The foregoing may be better understood by reference to the following examples, which are intended for illustrative purposes and are not intended to limit the scope of the invention.

Example 1

FIG. 1 depicts a simplified 3-component hot water system. Make-up water flows through a "Deaerator," a "FW Pump," and into a "Boiler." The boiler in turn generates "Useful Steam" that is used for various downstream processes. In this Example, ORP may be monitored/controlled at the Deaerator exit, labeled as "1" in FIG. 1, or at the FW Pump exit, labeled as "2" in FIG. 1. REDOX Stress may be reacted to in real-time as it occurs in the Deaerator and/or FW Pump independently. Active chemical species may also be fed into the Deaerator, after the Deaerator, and/or after the FW Pump for more specific corrosion control. While such adjustments to the real-time ORP typically occur during normal steady-state operation, intermittently operated systems or systems undergoing a layup sequence equally benefit from this deposit control regime.

Example 2

Figure 2:
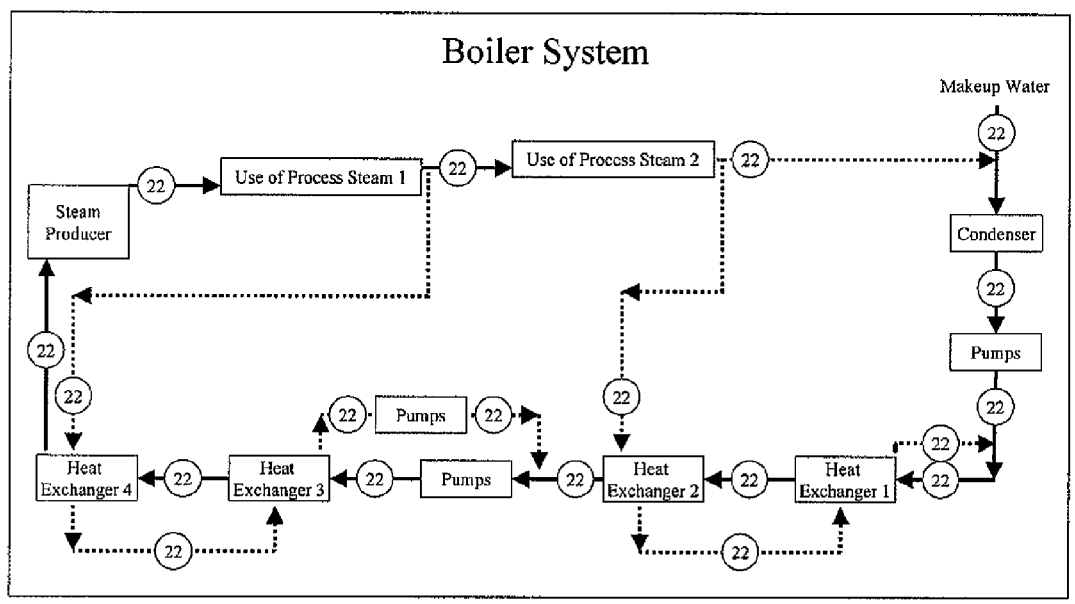
FIG. 2 illustrates a more complex boiler configuration, including a plurality of feed water pumps, a plurality of heat exchangers, and a steam producer.

FIG. 2 illustrates a more complex boiler configuration, including a plurality of feed water pumps, a plurality of heat exchangers, and a steam producer (i.e., boiler). In such a configuration, any number (i.e., one, two, or more) of condensers, heat exchangers, pumps, boilers, process steam applications, etc. could be used. In FIG. 2, flowing feed water is shown as solid arrowed lines as it moves toward the "Use of Process Steam" areas 1 and 2. Condensed steam is shown as dotted arrowed lines as it is fed to various plant locations, which could include the shell side of heat exchangers or directly back to the condensate areas. If desired, condensate that does not meet plant water specifications for boiler feed water could be drained out of the system as blow down.

Examples of positions where ORP could be monitored/controlled and/or feed locations for active chemical species are labeled as "22" in FIG. 2. Such user-controlled positioning allows local deposit inhibition/removal capabilities for a specific units and/or groups of units as well as global deposit control. While such adjustments to the real-time ORP typically occur during normal steady-state operation, intermittently operated systems or systems undergoing a layup sequence equally benefit from this deposit control regime.

Example 3

Figure 3:
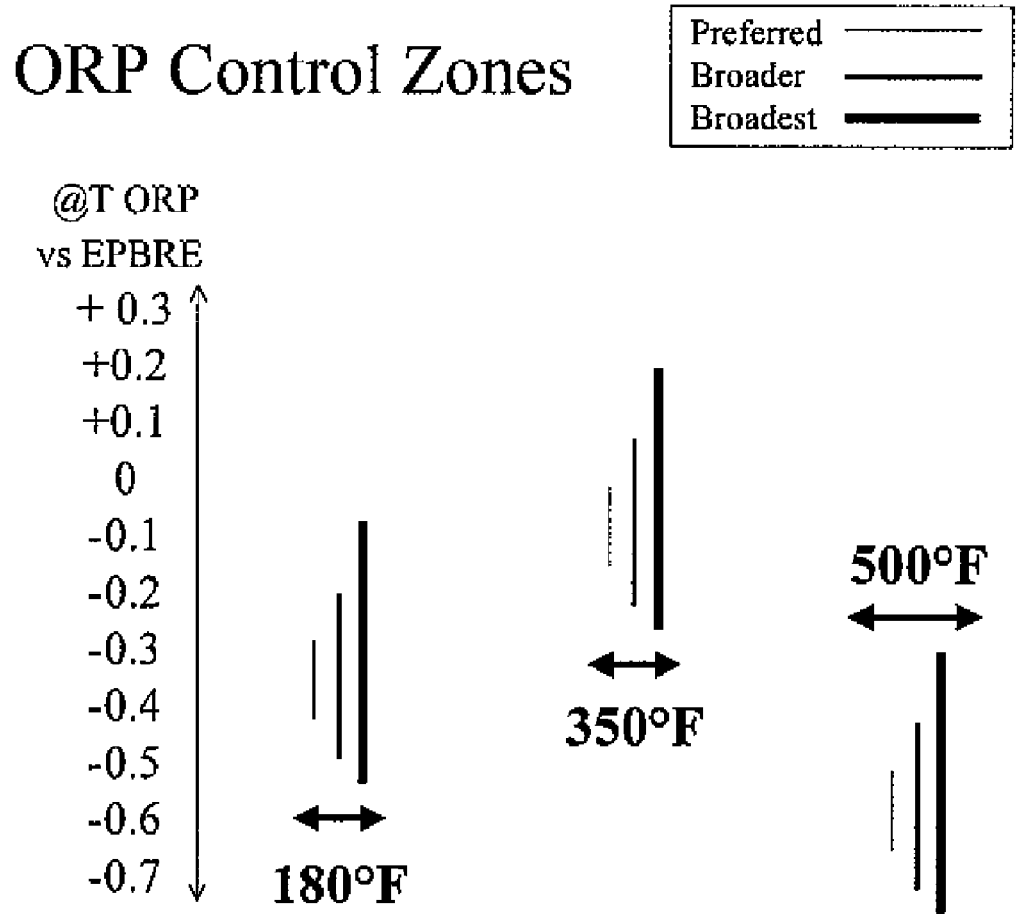
FIG. 3 depicts various "ORP Control Zones," where the ORP setting may be different for systems at various temperatures.

FIG. 3 depicts how the ORP setting may be different for systems at different temperatures. The temperatures shown in FIG. 3 may represent, for example, different plants or different operational protective/control zones in the same plant. In this Example, the ORP setting is an ORP set range selected from a series of ranges, shown as vertical lines labeled "Preferred," "Broader," and "Broadest." Depending upon the sophistication of equipment in the plant (i.e., operational limitations), the useable ORP set range or point may vary. That is, some plants are able to handle a narrow, or preferred, ORP set range, whereas other plants are able to handle only a broader ORP set range.

The @T ORP numbers would typically be recorded against an external pressure balanced reference electrode (designated as "EPBRE" in FIG. 3) having 0.1 normal potassium chloride filling solution. The first 180° F. control zone might be measured and controlled by an @T ORP probe positioned after "Heat Exchanger 2" (FIG. 2) in the feed water, and the active chemical species might be fed into the feed water just after the "Condenser" (FIG. 2) in the feed water.

The second 350° F. control zone might be measured and controlled by an @T ORP™ probe positioned after "Heat Exchanger 3" (FIG. 2) in the feed water, and the active chemical species might be fed into the feed water just prior to "Heat Exchanger 3" (FIG. 2) in the feed water.

The third 500° F. control zone might be measured and controlled by an @T ORP™ probe positioned after "Heat Exchanger 4" (FIG. 2) in the feed water, and the active chemical species might be fed into the feed water just prior to "Heat Exchanger 4" (FIG. 2) in the feed water.

Example 4

Figure 4:
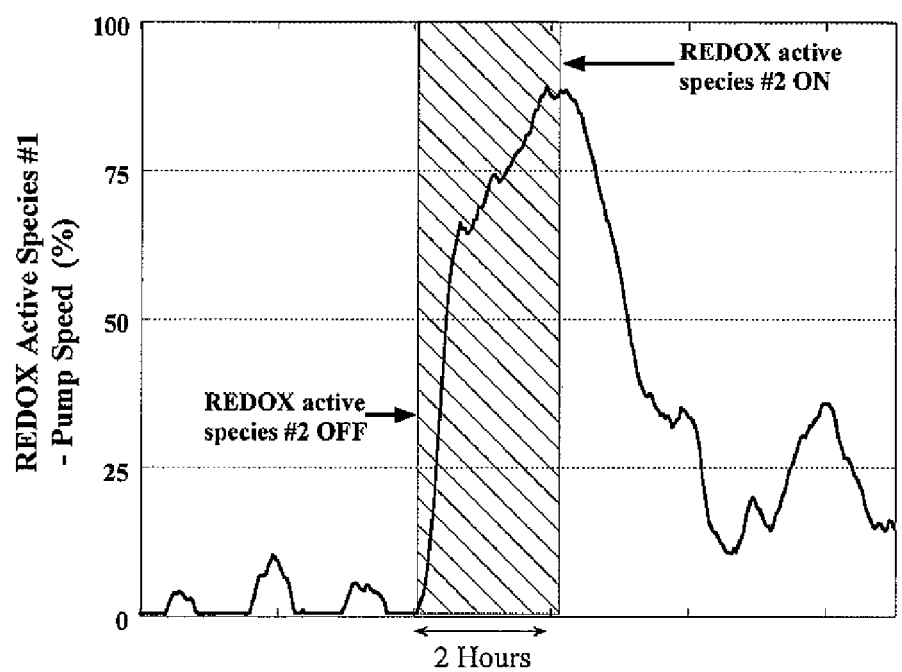
FIG. 4 illustrates feeding multiple REDOX active species at various locations to control the @T ORP at a single location.

This Example illustrates feeding multiple REDOX active species at various locations to control the @T ORP at a single location, as shown in FIG. 4. The controlling @T ORP probe was placed directly upstream of the feed location for REDOX active species #2. The @T ORP probe was used to measure the @T ORP prior to the feed of REDOX active species #2. The @T ORP probe was then switched to control the feed of another REDOX active species (#1), being fed upstream of the single @T ORP probe. It should be noted that when REDOX active species #2 (that was being manually controlled) was turned off, the effect of that loss quickly permeated the plant water chemistry and was sensed by the @T ORP probe. The controller (in this Example, the controller was automated for REDOX active species #1) immediately initiated additional feed of REDOX active species #1 to make-up for the shortfall in REDOX active species #2.

The controlled feed of REDOX active species #1 was able to achieve and maintain the @T ORP setting thus maximizing deposit control in the heat exchangers during this event. Note that as soon as the REDOX active species #2 was manually turned back on, the deposit control device (i.e., the @T ORP probe system) immediately compensated by cutting feed of REDOX active species #1 to maintain the desired @T ORP setting for deposit control.

Example 5

This Example illustrates an unpredicted response of the @T ORP probe to measure corrosion events directly and how real-time ORP measurements act as a direct indicator of deposit formation tendency in hot water systems from REDOX Stress events.

The @T ORP probe reacts to the formation of corrosion products (i.e., potential deposit constituents) in the FW. The REDOX stresses in the FW include contributions from complex conjugate ionic corrosion pairs like $Fe^{2+}/Fe^{3+}$ or $Cu^+/Cu^{2+}$, for example. In an all iron-based FW heater, water of high DO (i.e., greater than 500 ppb) starts to enter the FW heater. The room temperature ORP and real-time ORP at the heater inlet were initially −125 mV and −280 mV, respectively. On experiencing the added REDOX stress event, the room temperature ORP and real-time ORP at the heater inlet rose to −70 mV and −30 mV, respectively. The sensitivity of the @T ORP probe (real-time ORP increases 250 mV) is clearly seen as compared to the room temperature ORP probe (increased only 55 mV). The real-time and room temperature ORP probes at the FW heater exit were initially −540 mV and −280 mV, respectively. After the high REDOX stress event the real-time and room temperature ORP probes at the FW heater exit became −140 and −280 mV, respectively. It is important to note that the real-time ORP rose by 400 mV, whereas the room temperature ORP showed no change.

It is not intended to be bound to any particular theory; however, one theory that the room temperature ORP measurements at the exit of the FW heater showed no change was that the DO exiting the FW heater remained unchanged throughout the DO ingress event at the inlet of the FW heater. The reason the real-time ORP numbers rose so dramatically at the FW heater exit was most likely because of the corrosion that had occurred in the FW heater itself. This event generated a plentiful supply of ionic oxidized iron species, which the @T ORP probe detected, but the room temperature ORP probe did not.

The same effect was seen across copper based FW heaters where the dissolved oxygen was consumed within the FW heaters. Once again, room temperature ORP measurements showed no change at the exit of the FW heaters, but @T ORP probe responses showed elevated numbers as oxidized copper ionic species (conjugate pairs) were released into the FW and exited the FW heater, only to be sensed by the @T ORP probes and not the room temperature ORP instruments.

Example 6

Figure 5:
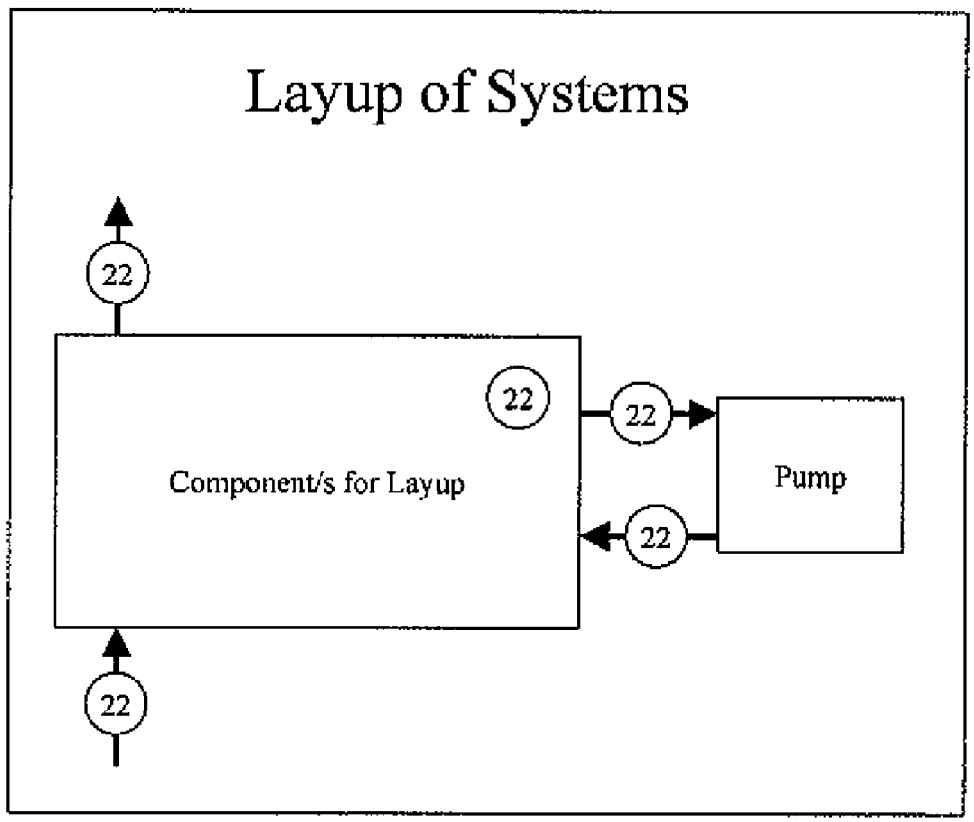
FIG. 5 illustrates that one or more ORP probes may be positioned in any of a multitude of locations for a layup sequence.

This Example illustrates that @T ORP probe positioning could be in any one or multiple of locations, labeled as "22" in FIG. 5. The real-time ORP could be measured at one or more locations within the component, in water entering or exiting the component, or at the inlet and/or outlet of a pump used to recalculate layup water ORP values in the component. REDOX active species could be fed into the component at any suitable location (or other location) to keep the @T ORP at a desired ORP setting for any phase of the layup process. In an embodiment, the ORP setting varies during the layup process. Alternatively, the ORP setting does not vary.

Example 7

Figure 6:
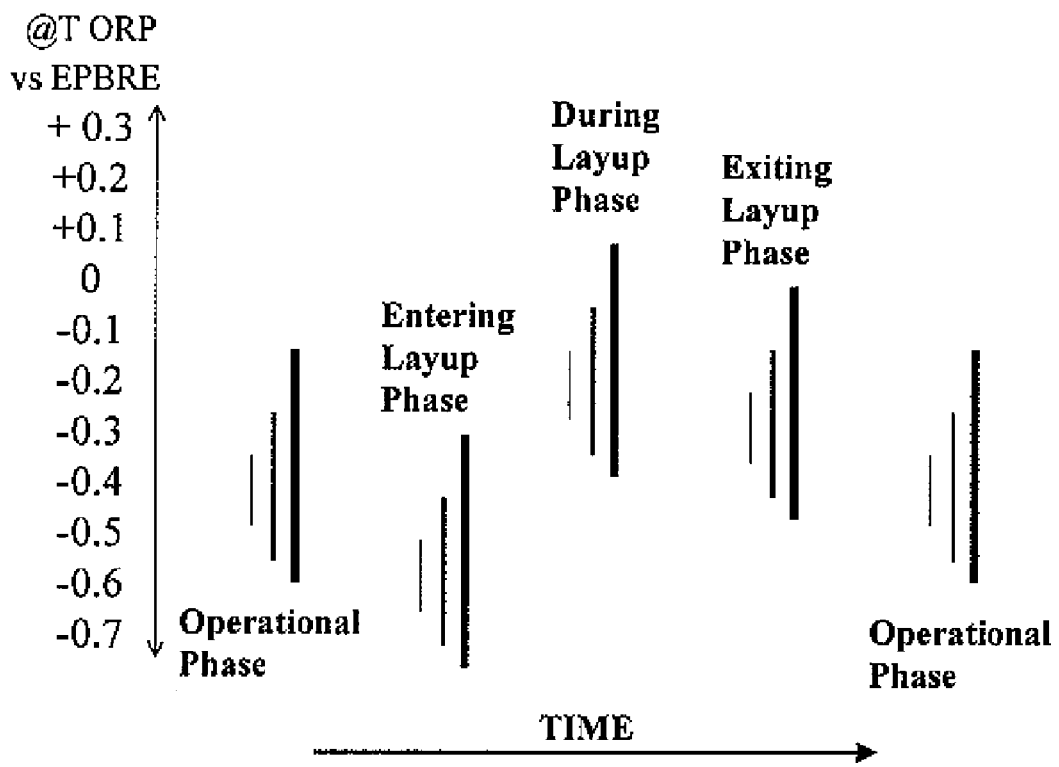
FIG. 6 shows various "ORP Control Zones for Layup" and examples of ORP settings for each phase of the layup sequence.

FIG. 6 shows a representative scenario for layup process ORP control, where a time sequence is presented as a component (or groups of components) go from operational use through layup and back to system operation. In this case, the @T ORP control zone might be further reduced while "Entering Layup," and more positive "During Layup." This difference is primarily due to the lower temperatures experienced in layup. In the "Exiting Layup" phase the system is made more reducing and the @T ORP setting drops further as system temperatures increase.

Example 8

This Example illustrates using real-time ORP measurement for online cleanup of heat transfer surfaces in a hot water system. A plant that had been operating using the @T ORP controlled feed of oxygen scavenger/reductant/metal passivator typically required several days to startup as it was limited by iron, copper, and silica loading (i.e., internal deposits) in the boiler. After being on the @T ORP program for just 5 months, these limitations were no longer an issue at startup. The plant was only limited in how fast it could thermally load the boiler (5 to 6 hours in this case), before it was back to full system load.

Reducing FW corrosion, in turn reduces deposits of corrosion products in the boiler and lowers corrosion product transport on startup. Boiler water suspended solids were lower at start up, thus eliminating pressure holds for total suspended solids reduction, prior to regaining full power. Lower metals transport during plant operations usually leads to lower entrapment or hideout (e.g., silica and phosphate) in the boiler and ultimately release during start up. For example, dirty boilers will cleanup as deposited material moves from the coated tube surfaces to the bulk water, which would have extremely low corrosion product suspension. This material then has the opportunity to go from tube surfaces to the bulk water and ultimately out with the boiler blowdown.

It should be understood that it will be apparent to those skilled in the art various changes and modifications to the described embodiments. Such changes and modifications can be made without departing from the spirit and scope of the invention and without diminishing its intended advantages. It is therefore intended that such changes and modifications be covered by the appended claims.

The claimed invention is:

1. A method of inhibiting and/or removing a deposit from an internal surface in a hot water system by controlling a real-time oxidation-reduction potential ("ORP") at operating temperature and pressure in the hot water system, the method comprising:
   (a) defining one or more operational protective zones ("zone" or "zones") in the hot water system;
   (b) selecting at least one of the defined zones, wherein one or more of the selected zones includes at least one ORP probe operable to measure the real-time ORP at operating temperature and pressure, wherein said operating temperature and pressure vary depending on whether the hot water system is online and operational or in a phase of a layup sequence, and operable to communicate with a controller;
   (c) assigning an ORP setting to one or more of the selected zones;
   (d) optimizing one or more of the assigned ORP settings to inhibit deposition or to cause release of at least a portion of the deposit into the water of the online hot water system;
   (e) either intermittently or continuously measuring the real-time ORP in situ at one or more of the selected zones;
   (f) transmitting the measured real-time ORP to the controller;
   (g) assessing whether the measured real-time ORP or a calculated ORP based upon the measured real-time ORP conforms to the optimized ORP setting; and
   (h) taking action to change the real-time ORP, if the measured real-time ORP or the calculated ORP does not conform to the ORP setting, wherein said action includes feeding an effective amount of one or more active chemical species into the hot water system and/or altering the temperature of one or more zones in the hot water system to inhibit deposition or to cause release of at least the portion of the deposit.

2. The method of claim 1, wherein the hot water system is in any phase of the layup sequence.

3. The method of claim 1, wherein the ORP probe includes a temperature detector, a noble metal electrode, and a reference electrode.

4. The method of claim 1, including optimizing the ORP setting to affect a dynamic between a component in the deposit and the component in the water of the hot water system to inhibit deposition or to cause release of at least the portion of the deposit into the water of the hot water system.

5. The method of claim 1, wherein the optimized ORP setting is selected from the group consisting of: an ORP set point chosen from one or more single values; an ORP set range chosen from one or more ranges of values; and an ORP set range including a series of successively smaller ranges.

6. The method of claim 1, wherein the optimized ORP setting is a same optimized ORP setting for each selected zone or a different optimized ORP setting for at least two of the selected zones.

7. The method of claim 1, including independently determining the ORP setting for one or more of the selected zones based upon operational limitations of the online hot water system.

8. The method of claim 1, wherein at least one of the selected zones is in a monitoring and/or alarm mode and at least one other selected zone is in a control mode.

9. The method of claim 8, wherein at least one of the selected zones is capable of switching between the monitoring and/or alarm mode and the control mode.

10. The method of claim 1, including measuring the real-time ORP at a first selected zone and feeding one or more active chemical species to the first selected zone, if the measured real-time ORP or the calculated ORP does not conform to the optimized ORP setting for the first selected zone; or measuring the real-time ORP at a first selected zone and feeding one or more active chemical species at one or more other selected zones, if the measured real-time ORP or the calculated ORP does not conform to the optimized ORP setting for the first selected zone.

11. The method of claim 1, including automatically feeding the active chemical species.

12. The method of claim 1, including manually feeding the active chemical species.

13. The method of claim 1, wherein the active chemical species is selected from the group consisting of: oxidants, reductants, corrosion-inhibitors, corrodants, and combinations thereof.

14. The method of claim 1, wherein the released portion of the deposit exits the hot water system as blow-down.

15. The method of claim 1, wherein the deposit is selected from the group consisting of: hard scale, soft scale, silica, phosphates, entrapped organic material, corrosion products, and combinations thereof.

16. The method of claim 1, including operating the method over a network.

17. The method of claim 16, wherein the network is an Internet.

18. A digital storage medium having computer-executable instructions stored thereon, the instructions operable to execute the method of claim 1.

19. The method of claim 1, wherein the hot water system is selected from the group consisting of: fossil fuel fired water-tube or fire-tube boilers; hot water heaters; heat exchangers; steam generators; nuclear power electric systems including light water reactors, pressurized water reactors, and boiling water reactors; marine units; combustion engine and diesel coolant systems; evaporator systems; thermal desalination systems; evaporator systems; hot water systems used in papermaking operations including pulping processes and bleaching processes; condensate systems; hot water systems used in wafer polishing and planarization processes; hot water systems used in combustion gas emissions; hot water systems used in molding processes; hot water systems used in fermentation processes; hot water systems used in geothermal processes; hot water systems used in aqueous organic redox synthesis; hot water systems used in polymerization processes; steam ejection equipment; hot water systems used in processing operations; and ancillary devices attached thereto.

20. A deposit inhibition and/or removal device for a hot water system, wherein the hot water system is in any phase of a layup sequence or is online and operational, the online hot water system having one or more operational protective zones ("zone" or "zones"), wherein a subset of the zones are selected zones, the device comprising:

a receiver in communication with one or more oxidation-reduction potential ("ORP") probes, a subset of the ORP probes being activated, each activated ORP probe operable to measure a real-time ORP in situ and at operating temperature and pressure in the hot water system, and one or more of the selected zones including at least one ORP probe;

a processor operable to interpret the measured real-time ORP communicated to the receiver from each activated ORP probe, wherein the processor either interprets the measured real-time ORP directly or interprets a calculated ORP based upon the measured real-time ORP, and wherein the interpreted ORP indicates a dynamic between one or more components in said deposit on a surface of the hot water system and the water of the hot water system; and a transmitter in communication with a feeding device operable to manage introduction of one or more active chemical species into the hot water system to affect changes in the dynamic, wherein the processor is operable to send an output signal through the transmitter to the feeding device, or wherein the transmitter is in communication with one or more temperature-altering devices operable to receive a signal and initiate a sequence to alter the temperature in one or more zones, if the interpreted real-time ORP does not conform to an optimized ORP setting, wherein the optimized ORP setting relates to the dynamic and inhibits deposition or effectuates release of at least a portion of said deposit into the water of the hot water system.

* * * * *